United States Patent [19]

Fujino et al.

[11] Patent Number: 6,047,682

[45] Date of Patent: Apr. 11, 2000

[54] ACCUMULATING TYPE FUEL INJECTION CONTROL

[75] Inventors: Yutaka Fujino; Akihiko Sekiguchi, both of Tokyo, Japan

[73] Assignee: Mitsubishi Jidosha Kogyo Kabushiki Kaisha, Tokyo, Japan

[21] Appl. No.: 09/043,212

[22] PCT Filed: Jul. 16, 1997

[86] PCT No.: PCT/JP97/02461

§ 371 Date: Mar. 17, 1998

§ 102(e) Date: Mar. 17, 1998

[87] PCT Pub. No.: WO98/02654

PCT Pub. Date: Jan. 22, 1998

[30] Foreign Application Priority Data

Jul. 17, 1996 [JP] Japan .................................. 8-187266

[51] Int. Cl.[7] .................................................. F02M 37/04
[52] U.S. Cl. .......................... 123/458; 123/357; 123/381; 123/501; 123/447
[58] Field of Search ...................... 123/456, 468, 123/469, 514, 357, 467, 381, 458, 464, 447, 436, 500–501; 239/96

[56] References Cited

U.S. PATENT DOCUMENTS

| | | | |
|---|---|---|---|
| 4,522,177 | 6/1985 | Kawai et al. ............................ | 123/381 |
| 5,176,120 | 1/1993 | Takahashi ............................... | 123/447 |
| 5,313,924 | 5/1994 | Regueiro ................................. | 123/458 |
| 5,423,302 | 6/1995 | Glassey ................................... | 123/381 |
| 5,586,538 | 12/1996 | Barnes .................................... | 123/381 |
| 5,848,583 | 12/1998 | Smith et al. ............................ | 123/467 |

FOREIGN PATENT DOCUMENTS

| | | |
|---|---|---|
| 62-101856 | 5/1987 | Japan . |
| 62-18675 Y2 | 5/1987 | Japan . |
| 64-66438 | 3/1989 | Japan . |
| 6-93936 | 4/1994 | Japan . |
| 8-42376 | 2/1996 | Japan . |

Primary Examiner—Thomas N. Moulis

[57] ABSTRACT

In an accumulator type fuel injection control device, a feed hole (28) provides communication between a common rail (24) for storing fuel from a fuel pressure pump (29) and a fuel injection valve (11); a control oil passage (23a, 23b, 23c) extends from the feed hole (28) to an oil chamber (19); a three-way electromagnetic valve (23) exerts the pressure of a fuel oil on the oil chamber (19) to close a needle valve (15), and discharges the fuel oil in the oil chamber (19) to a fuel return passage (51) to open the needle valve (15); fuel oil pressure correcting means (103) corrects a fuel oil pressure $P_0$ on the basis of a fuel oil temperature $t_F$ detected by fuel oil temperature detecting means (44); and simultaneously, fuel injection volume correcting means (108) corrects a fuel injection volume $Q_0$; whereby the temperature of fuel flowing to a fuel return system is suppressed to prevent damage to members used in the fuel return system.

10 Claims, 7 Drawing Sheets

ACCUMULATING TYPE FUEL INJECTION CONTROL

This application is the national phase under 35 U.S.C. §371 of prior PCT International Application No., PCT/JP97/02461, which has an International filing date of Jul. 16, 1997, which designated the United States of America, the entire contents of which are hereby incorporated by reference.

TECHNICAL FIELD

The present invention relates to an accumulator type fuel injection control device for controlling the injection of fuel with the use of an accumulator type unit injector.

BACKGROUND ART

Generally, an accumulator type fuel injection control device is mounted in a fuel supply system of a diesel engine, and provided with an accumulator type unit injector in the fuel supply system, a fuel pressure pump, and a controller which functions as a control system.

In the accumulator type fuel injection control device for a diesel engine, therefore, a plunger is driven by an eccentric cam, which is driven in interlock with a crank shaft of the engine, and a fuel of a low pressure, which has been fed into a pump chamber by means of a feed pump, is pressurized to a high pressure and then fed to an accumulator. In accordance with the operating condition of the engine, a drive command is outputted from the controller to an electromagnetic actuator to open or close a spill valve, whereby the fuel pressure in the accumulator is controlled to a high level. On the other hand, a signal indicating the fuel pressure in the accumulator is fed back to the controller from a fuel pressure sensor.

The high-pressure fuel, present in the accumulator, is fed to a fuel reservoir through a feed hole of a fuel injection nozzle to urge a needle valve in its opening direction. When the fuel injection nozzle is not in operation, an electromagnetic actuator of a three-way solenoid valve is de-energized and the high-pressure fuel in the accumulator is fed to an oil chamber. A hydraulic piston applies a depressing force based on such hydraulic pressure to the needle valve, whereby the needle valve is held in its closed position.

When the electromagnetic actuator is energized in accordance with a drive command outputted from the controller, the oil chamber is connected to a fuel tank by the three-way solenoid valve and the fuel pressure exerted on the hydraulic piston is relieved, so that the needle valve is opened by the spring force of a pressure spring, and the high-pressure fuel, present in the fuel reservoir, is injected into a cylinder through the nozzle hole.

In such an accumulator type fuel injection control device for a diesel engine, the volume of fuel to be injected is calculated and set in the controller on the basis of both engine speed and accelerator opening. Fuel injection pressure and fuel injection timing are set on the basis of both engine speed and fuel injection volume. Therefore, the control system controls the electromagnetic actuator on the basis of both fuel injection pressure and fuel injection volume so that a required amount of fuel is injected at a required pressure.

Such an accumulator type fuel injection control device is disclosed, for example, in Japanese Unexamined Patent Publication No. 93936/94.

In the accumulator type fuel injection control device for a diesel engine as described above, the fuel tank is provided on the vehicle body side, while the fuel pressure pump and the injection nozzle, with fuel supplied thereto from the fuel tank, are provided on the engine side. Since the engine vibrates during operation, it is supported by a mount so as to be rollable with respect to the vehicle body. Therefore, a hose on the engine side extending from the injection nozzle is connected to a piping on the vehicle body side through a rubber hose, and this piping is extended to the fuel tank. On the other hand, a piping on the engine side, extended from the fuel pressure pump through the feed pump, is also connected to the piping on the vehicle body side through a rubber hose, and this piping is extended to the fuel tank.

In the injection nozzle, the electromagnetic actuator is energized in accordance with a drive command outputted from the controller, and by the operation of the three-way solenoid valve, the fuel in the oil chamber is discharged to the fuel tank through a piping and a rubber hose or the like. The amount of fuel, thus discharged into the fuel tank, is almost equal to or larger than the volume of fuel injected, and it is an amount of return. This fuel is in a condition of high temperature due to the heat generated when the fuel is pressurized by the fuel pressure pump after the high-pressure injection of fuel has been continued for a long time, or due to the heat generated as a result of conversion from energy generated when the pressurized fuel is released to the atmospheric pressure through the injection nozzle which injects the fuel at a high pressure.

Consequently, a large amount of fuel held at a high temperature is discharged from the injection nozzle into the fuel tank through the piping and rubber hose. When the high-temperature fuel flows in a large amount through the rubber hose, there has been a possibility for damage caused to the rubber hose. There has also been the problem that the fuel tank made of resin, which accommodates the return fuel of high temperature, undergoes accelerated deterioration.

The present invention aims to provide an accumulator type fuel injection control device, which suppresses the temperature rise of fuel flowing to a fuel return system, to prevent deterioration of and damage to the members used in the fuel return system; which prevents burns in the operator upon contact with the fuel tank or other peripheral part to improve safety; and which enables temperature control while preventing a decrease in engine output.

DISCLOSURE OF THE INVENTION

The accumulator type fuel injection control device of the present invention for attaining the foregoing object has an accumulator for accumulating the pressure of a fuel oil which is fed under pressure from a fuel pressure pump and for storing the fuel oil; a feed oil passage which provides communication between the accumulator and an injection fuel reservoir in a fuel injection valve; a control oil passage branched at one end thereof from the feed oil passage and leading at the other end thereof to an oil chamber which is formed within the fuel injection valve and which serves to control the opening and closing of a needle valve; a fuel injection control valve disposed in the control oil passage, for exerting the pressure of the fuel oil on the oil chamber to close the needle valve disposed within the fuel injection valve, and for discharging the fuel oil present in the oil chamber to a fuel return passage to open the needle valve, thereby allowing fuel injection to be performed; fuel oil temperature detecting means for detecting the temperature of the fuel oil; fuel oil pressure correcting means for correcting the pressure of the fuel oil on the basis of the temperature of the fuel oil detected by the fuel oil temperature detecting means; and fuel injection volume correcting means for correcting the volume of fuel injection simultaneously with the fuel oil pressure correcting means.

Thus, the fuel oil stored, with its pressure accumulated, in the accumulator is fed through the feed oil passage to the injection fuel reservoir in the fuel injection valve, and the fuel oil pressure is exerted on the needle valve on-off controlling oil chamber in the fuel injection valve from the control oil passage by means of the fuel injection control valve, thereby closing the needle valve disposed within the fuel injection valve. Whereas the fuel oil present in the oil chamber is discharged to the fuel return passage, thereby opening the needle valve and allowing the fuel to be injected. At this time, the fuel oil temperature detecting means detects the temperature of the fuel oil present in the fuel return passage, and the fuel oil pressure correcting means corrects the pressure of the fuel oil on the basis of the fuel oil temperature detected by the fuel oil temperature detecting means. At the same time, the fuel injection volume correcting means corrects the amount of fuel injection.

Therefore, the fuel oil pressure correcting means corrects the pressure of the fuel oil on the basis of the fuel oil temperature. Simultaneously, the fuel injection volume correcting means corrects the volume of fuel injection. This makes possible the temperature control of the fuel oil, e.g., control for preventing damage to the members used in the fuel return system to improve safety, and also the control of engine output, e.g., control for restoring output.

The accumulator type fuel injection control device of the present invention is also constituted such that the higher the temperature of the fuel oil detected by the fuel oil temperature detecting means is, the lower the pressure of the fuel oil corrected by the fuel oil pressure correcting means becomes, and also the larger the volume of fuel injection corrected by the fuel injection volume correcting means becomes.

In performing control for the temperature correction of the fuel oil, therefore, the fuel oil pressure correcting means corrects the fuel oil pressure to a lower value when the temperature of the fuel oil begins to rise excessively. At this time, the fuel injection volume correcting means corrects the volume of fuel injection to a larger value, thereby recovering engine output decreased by the lowering of the fuel oil pressure. Thus, the fuel oil pressure can be lowered to prevent an excessive rise in the temperature of the fuel oil, prevent damage to the members used in the fuel return system, and improve safety. Furthermore, a drop in engine performance associated with the temperature control of the fuel oil can be prevented.

The accumulator type fuel injection control device of the present invention also includes fuel injection timing control means for controlling the timing of fuel injection. When the fuel oil pressure correcting means corrects the pressure of the fuel oil to a lower side, the fuel injection timing correcting means corrects the fuel injection start timing to an advance side, and the fuel injection volume correcting means corrects the volume of fuel injection to a larger value.

In performing control for the temperature correction of the fuel oil, therefore, the fuel injection timing correcting means corrects the start timing for fuel injection to the advance side, thereby further recovering engine output decreased by the lowering of the fuel oil pressure. Thus, the fuel oil pressure can be lowered to prevent an excessive rise in the temperature of the fuel oil more reliably, prevent damage to the members used in the fuel return system, and improve safety further.

The accumulator type fuel injection control device of the present invention is also constituted such that a control quantity for correcting the fuel injection start timing to an advance side by the fuel injection timing correcting means is set on the basis of a map or constant set in accordance with a corrected pressure obtained by the fuel oil pressure correcting means.

Thus, when the fuel injection timing correcting means determines the control quantity for correcting the fuel injection start timing to an advance side, it sets the control quantity on the basis of a map or constant set in accordance with a corrected pressure obtained by the fuel oil pressure correcting means. Therefore, the control associated with the calculation of the control quantity for the fuel injection timing is facilitated.

The accumulator type fuel injection control device of the present invention is also constituted such that a control quantity for correcting the fuel injection volume to an increment side by the fuel injection volume correcting means is set on the basis of a map or constant set in accordance with a corrected pressure obtained by the fuel oil pressure correcting means.

Thus, when the fuel injection volume correcting means determines the control quantity for correcting the fuel injection volume to an increment side, it sets the control quantity on the basis of a map or constant set in accordance with a corrected pressure obtained by the fuel oil pressure correcting means. Therefore, the control associated with the calculation of the control quantity for the fuel injection volume is facilitated.

The accumulator type fuel injection control device of the present invention is also constituted such that a control quantity for correcting the fuel injection volume to an increment side by the fuel injection volume correcting means is set on the basis of the temperature of the fuel oil detected by the fuel oil temperature detecting means.

Thus, when the fuel injection volume correcting means determines the control quantity for correcting the fuel injection volume to an increment side, it sets the control quantity on the basis of the temperature of the fuel oil detected by the fuel oil temperature detecting means. Therefore, the control associated with the calculation of the control quantity for the fuel injection volume is facilitated.

The accumulator type fuel injection control device of the present invention is also constituted such that the fuel oil temperature detecting means detects the temperature of the fuel oil in the fuel return passage.

Thus, highly accurate control for correction becomes possible.

In the accumulator type fuel injection control device of the present invention, it is also desirable that a constituent part made of resin be used in the fuel return system including the fuel return passage, the fuel return passage be formed of resin, or the fuel tank, from which fuel is pumped out by the fuel pressure pump, be made of resin. This leads to a light weight and a low cost.

BEST MODE FOR CARRYING OUT THE INVENTION

The embodiments of the present invention will be described in detail below.

Figure 1:
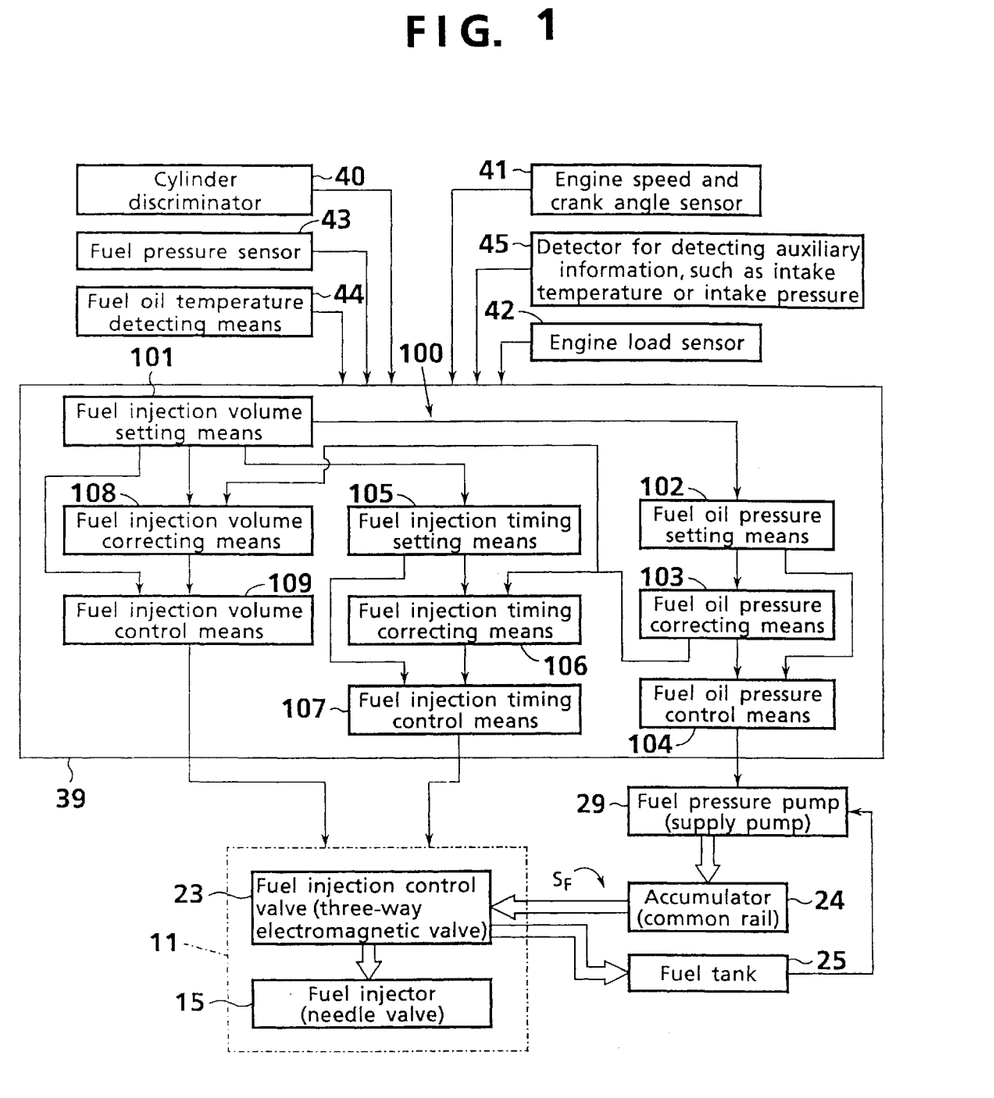
FIG. 1 is a block diagram showing the functions of an accumulator type fuel injection control device related to the present invention, and a fuel supply system connected to this device.

An accumulator type fuel injection control device embodying the present invention, as shown in FIG. 1, is mounted in a fuel supply system $S_F$ of a diesel engine (not shown), and has an accumulator type unit injector 11 in the fuel supply system $S_F$, a supply pump 29 as a fuel pressure pump, and a controller 39 incorporating the functions of a control system of the present control device.

First, the construction of an accumulator type fuel injection control device for a diesel engine will be described with reference to FIG. 10.

Figure 10:
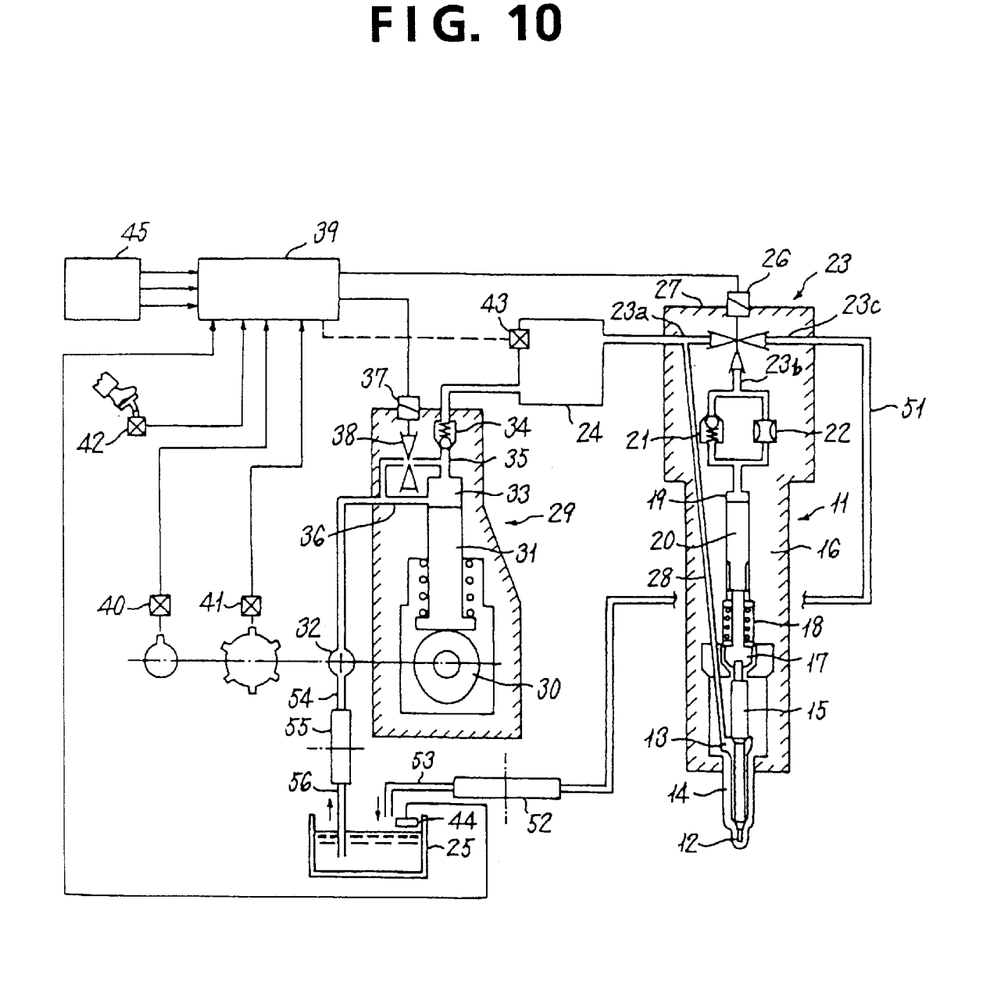
FIG. 10 is a schematic construction diagram of an accumulator type fuel injection control device generally used in a diesel engine.

In the accumulator type fuel injection control device of the present invention for use in a diesel engine, as shown in FIG. 10, the numeral 11 generally denotes a fuel injection nozzle. The injection nozzle 11 has a nozzle 14 with a plurality of fuel injection nozzle holes 12 formed in its tip end and with a fuel reservoir 13 formed therein for storing fuel to be fed to the nozzle holes 12.

Within the nozzle 14, a needle valve 15 for controlling the communication between the nozzle holes 12 and the fuel reservoir 13 is housed slidably in a vertical direction. The needle valve 15 is always urged in its closing direction by a pressure spring 18 via a push rod 17, which is accommodated within a nozzle holder 16. In the nozzle holder 16, an oil chamber 19 is formed, and a hydraulic piston 20 is slidably fitted into the oil chamber 19 coaxially with the needle valve 15 and the push rod 17.

The oil chamber 19, formed within the nozzle holder 16, is connected to a first outlet 23b of a three-way solenoid valve 23 via a one-way valve 21 and an orifice 22 which are arranged in parallel. The three-way solenoid valve 23 is connected to an inlet 23a communicating with a common rail 24 as an accumulator, and also connected to a second outlet 23c communicating with a fuel tank 25. The first outlet 23b is selectively connectable to either the inlet 23a or the second outlet 23c through a valve element 27 which is driven by an electromagnetic actuator 26. When the electromagnetic actuator 26 is deenergized, the first outlet 23b communicates with the inlet 23a. When the electromagnetic actuator 26 is energized, the first outlet 23b communicates with the second outlet 23c. In the nozzle holder 16 and the nozzle 14, a feed hole 28 is provided for connecting the fuel reservoir 13 to the common rail 24.

Fuel of a high pressure preset according to the operating condition of the engine is fed to the above-mentioned common rail 24 by means of a supply pump indicated generally at 29. The supply pump 29 has an eccentric cam 30, which is driven in interlock with a crank shaft (not shown) of the engine, and also has a plunger 31 which is driven by the eccentric cam 30 in a reciprocating manner. A low-pressure feed pump 32 draws fuel from the fuel tank 25 and feeds pressurized fuel into a pump chamber 33, and the plunger 31 feeds the pressurized fuel to the common rail 24 through a one-way valve 34.

Between an ejection-side passage 35, formed in the pump chamber 33 of the supply pump 29, and a suction-side passage 36 communicating with the feed pump 32, a spill valve 38 is disposed which is opened and closed by an electromagnetic actuator 37. The electromagnetic actuator 37 and the aforementioned electromagnetic actuator 26 of the three-way solenoid valve 23 are controlled by a controller 39.

The controller 39 is connected to a cylinder discriminator 40 for discriminating individual cylinders of a multi-cylinder engine, an engine speed and crank angle sensor 41, an engine load sensor (accelerator opening sensor) 42, a fuel pressure sensor 43 for detecting the fuel pressure in the common rail 24, a fuel temperature sensor 44 for detecting, as fuel oil temperature detecting means, the return temperature of the fuel returning to the fuel tank 25, and a detector 45 for detecting auxiliary information pieces, such as an intake temperature, an intake pressure and fuel temperature, which affect the operating condition of the engine where necessary. In accordance with such various information pieces inputted, the controller 39 can control the electromagnetic actuators 26 and 37.

An engine-side piping 51, extending from the second outlet 23c of the three-way solenoid valve 23 in the injection nozzle 11, is connected to a vehicle body-side piping 53 by a rubber hose 52. The piping 53 extends to the fuel tank 25. Further, an engine-side piping 54, extending to the suction-side passage 36 in the supply pump 29 through the feed pump 32, is connected to a vehicle body-side piping 56 by a rubber hose 55. This piping 56 extends the fuel tank 25.

The manner of operation of the aforementioned accumulator type unit injector will now be described briefly.

First, the plunger 31 is driven by the eccentric cam 30 driven in interlock with the engine crank shaft, whereby the low-pressure fuel fed to the pump chamber 33 by the feed pump 32 is pressurized to a high pressure and is then fed to the common rail 24.

In accordance with the operating condition of the engine based on various information pieces, a drive command is outputted from the controller 39 to the electromagnetic actuator 37 to open or close the spill valve. 38, whereby the fuel pressure in the common rail 24 is controlled beforehand to a high pressure (e.g., 800 to 1,000 atmospheres). On the other hand, a signal indicative of the fuel pressure in the common rail 24 is fed back to the controller 39 from the fuel pressure sensor 43.

The high-pressure fuel in the common rail 24 is fed to the fuel reservoir 13 through the feed hole 28 of the fuel injection nozzle 11, and urges the needle valve 15 upward, namely, in its opening direction. On the other hand, when the fuel injection nozzle 11 is not in operation, the electromagnetic actuator 26 of the three-way solenoid valve 23 is deenergized, and the inlet 23a and the first outlet 23b are in communication with each other. Consequently, the high-pressure fuel in the common rail 24 passes through the one-way valve 21 and the orifice 22, and is fed to the oil chamber 19.

The hydraulic piston 20 in the oil chamber 19 is urged downwardly by the fuel pressure in the oil chamber 19, and a valve closing force, which is the sum of the depressing force based on such hydraulic pressure and the biasing force of the pressure spring 18, is applied to the needle valve 15 via the push rod 17. The area of receiving the fuel oil pressure acting downward on the hydraulic piston 20 is set to be sufficiently larger than the working area of the fuel pressure acting upward on the needle valve 15. Further, the downward spring force of the pressure spring 18 acts as an additional working force. Therefore, the needle valve 15 is held in its closed position as illustrated.

Next, when the electromagnetic actuator 26 is energized in accordance with a drive command outputted from the controller 39, the inlet 23a and the first outlet 23b are disconnected from each other, and the first outlet 23b and the second outlet 23c come into communication with each other. Consequently, the oil chamber 19 is connected to the fuel tank 25 via the orifice 22 and the second outlet 23c. Moreover, the fuel pressure having acted on the hydraulic piston 20 is relieved, the pressure spring 18 is overcome by the fuel pressure acting upward on the needle valve 15, the needle valve 15 is opened, and the high-pressure fuel in the fuel reservoir 13 is injected into the cylinder through the nozzle holes 12.

Then, after the lapse of a time, which has been preset according to the operating condition of the engine, the electromagnetic actuator 26 is deenergized by the controller 39, and the inlet 23a and the first outlet 23b of the three-way solenoid valve 23 again come into communication with each other, whereby the fuel pressure in the common rail 24 is applied to the hydraulic piston 20. Thus, the needle valve 15 is closed to terminate the injection of fuel.

In the accumulator type fuel injection control device constructed as above, the controller 39 has its essential part constructed from a well-known electronic control device, and has the functions of a control unit of an accumulator type fuel injection control device 100 as shown in FIG. 1.

That is, the accumulator type fuel injection control device 100 includes fuel injection volume setting means 101, which sets a basic fuel injection volume $Q_0$ on the basis of an engine speed Ne and an accelerator opening $\theta$; fuel oil pressure setting means 102, which sets a basic fuel injection pressure $P_0$ on the basis of the engine speed Ne and the basic fuel injection volume $Q_0$; fuel oil pressure correcting means 103 which, based on the temperature $t_F$ of the fuel returning to the fuel tank 25 (i.e., return temperature), corrects the basic fuel injection pressure $P_0$ set by the fuel oil pressure setting means 102 and sets a corrected fuel injection pressure $P_A$; and fuel oil pressure control means 104, which controls the spill valve 38 in the supply pump 29 on the basis of the basic fuel injection pressure $P_0$ or the corrected fuel injection pressure $P_A$ which has been set.

The accumulator type fuel injection control device 100 further includes fuel injection timing setting means 105, which sets a basic fuel injection timing $T_0$ on the basis of the engine speed Ne and the basic fuel injection volume $Q_0$; fuel injection timing correcting means 106 which, when the temperature $t_F$ of the fuel returning to the fuel tank 25 (i.e., return temperature) lies within the control range and when the corrected fuel injection pressure $P_A$ has been set, corrects the basic fuel injection timing $T_0$ and sets a corrected fuel injection timing $T_A$; and fuel injection timing control means 107, which controls the three-way solenoid valve 23 as a fuel injection control valve in the accumulator type unit injector 11 on the basis of the basic fuel injection timing $T_0$ or the corrected fuel injection timing $T_A$ that has been set.

The accumulator type fuel injection control device 100 still further includes fuel injection volume correcting means 108 for correcting the basic fuel injection volume $Q_0$, which has been set by the fuel injection volume setting means 101, to the corrected fuel injection volume $Q_A$ on the basis of the temperature $t_F$ of the fuel returning to the fuel tank 25 (i.e., return temperature); and fuel injection volume control means 109 for controlling the three-way solenoid valve 23 in the accumulator type unit injector 11 on the basis of the basic fuel injection volume $Q_0$ or the corrected fuel injection volume $Q_A$ that has been set.

Next, the principle of setting the basic fuel injection volume $Q_0$ and the corrected fuel injection volume $Q_A$, the principle of setting the basic fuel injection pressure $P_0$ and the corrected fuel injection pressure $P_A$, and the principle of setting the basic fuel injection timing $T_0$ and the corrected fuel injection timing $T_A$, by the accumulator type fuel injection control device 100, will be described with reference to the flowchart of FIG. 2 for the fuel injection control procedure and the flowchart of FIG. 3 for the correction quantity setting procedure.

Figure 2:
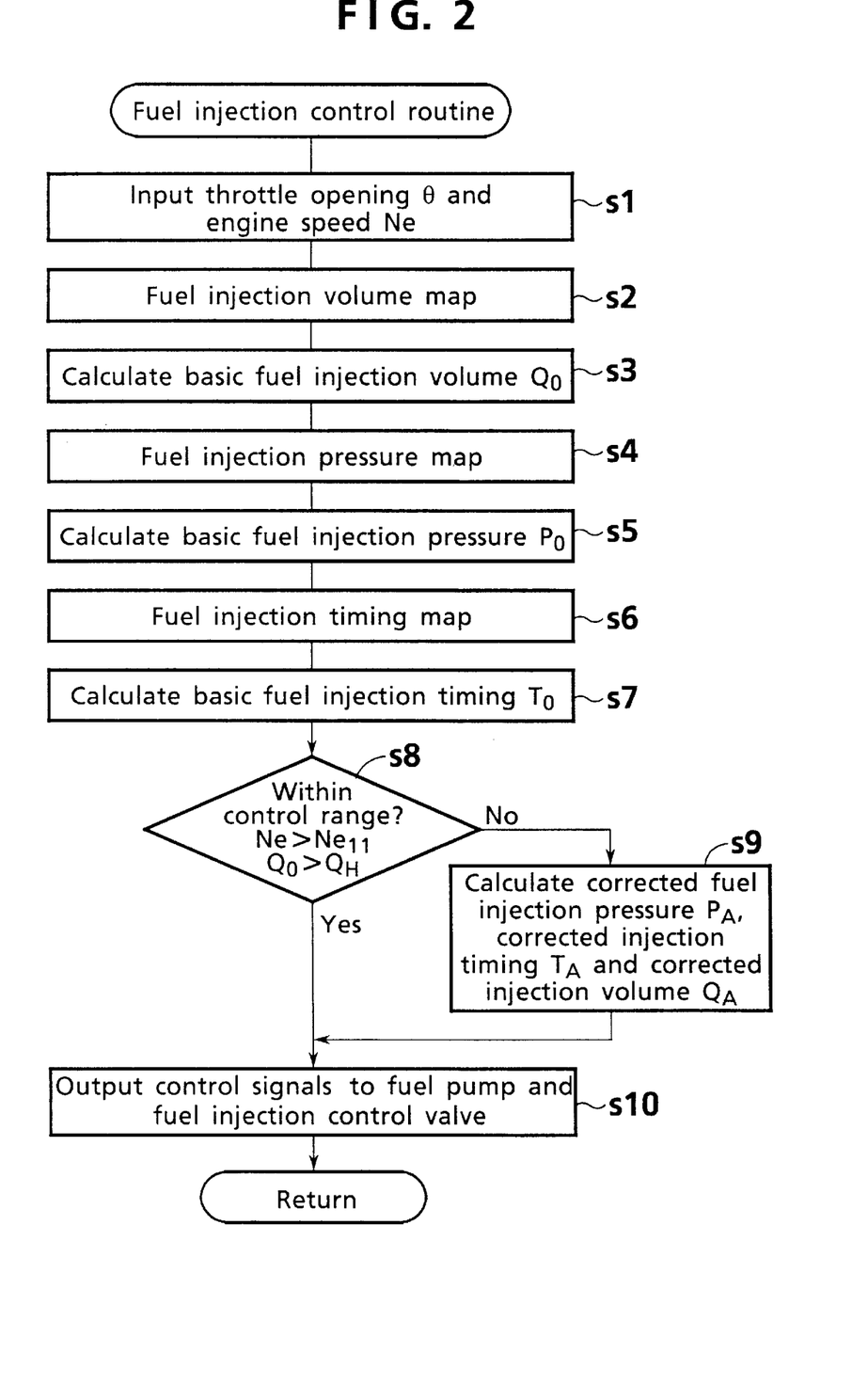
FIG. 2 is a flowchart for a fuel injection control procedure that this accumulator type fuel injection control device adopts.
Figure 3:
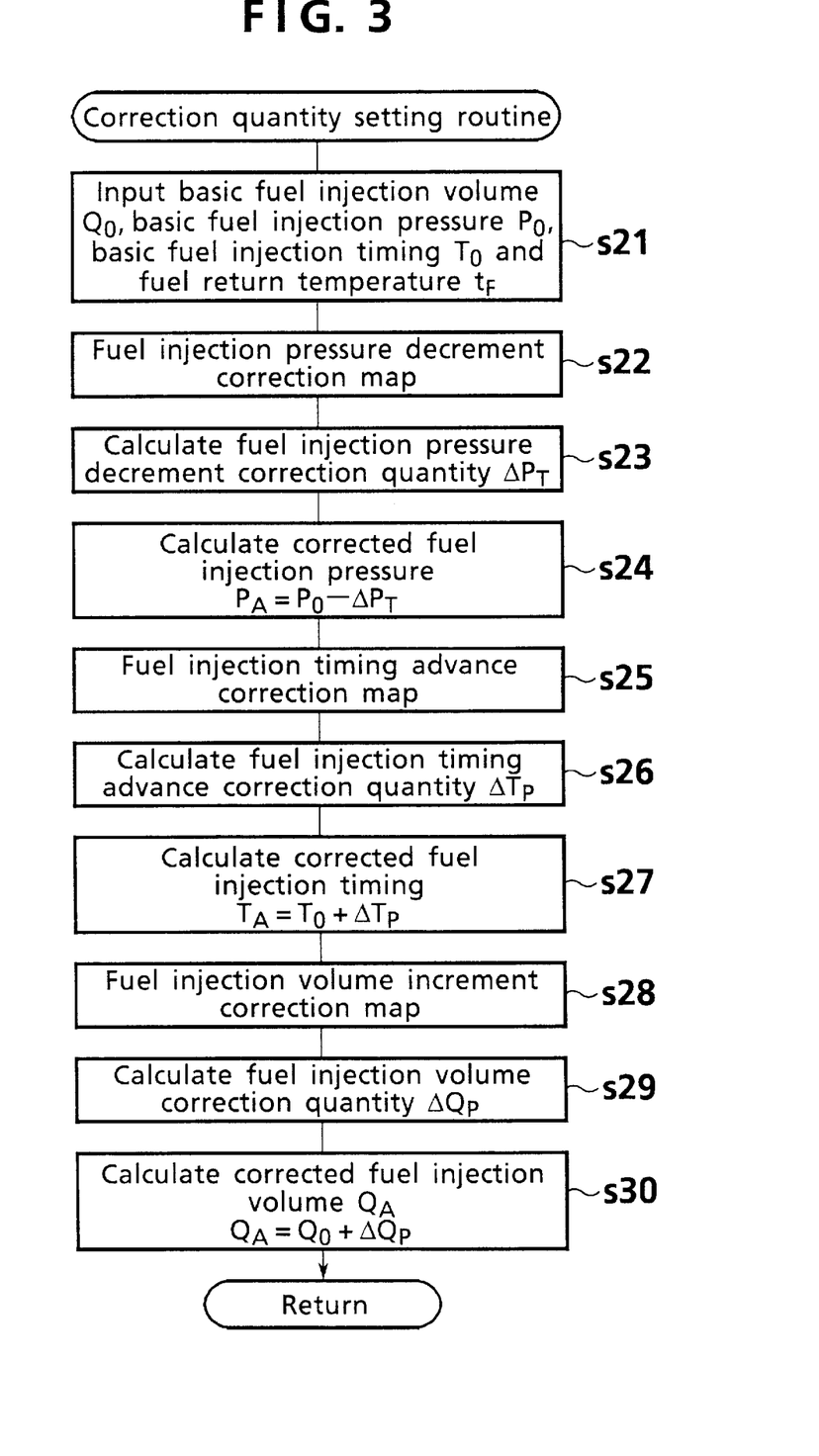
FIG. 3 is a flowchart for a correction quantity setting procedure that the accumulator type fuel injection control device adopts.

When the controller 39 starts operating, the procedure reaches a fuel injection control routine and a correction quantity setting routine showing in FIGS. 2 and 3, respectively, halfway through a main routine of the engine (not shown) performed by the controller 39.

In step s1 of the fuel injection control routine shown in FIG. 2, the throttle opening $\theta$ and the engine speed Ne are read. In step s2, a fuel injection volume map (not shown) which has been preset is read. In step s3, a basic fuel injection volume $Q_0$ is calculated from the throttle opening $\theta$ and the engine speed Ne. In step s4, a fuel injection pressure map (not shown) which has been preset is read. In step s5, a basic fuel injection pressure $P_0$ is calculated from the engine speed Ne and the basic fuel injection volume $Q_0$. In step s6, a fuel injection timing map (not shown) which has been preset is read. In step s7, a basic fuel injection timing $T_0$ is calculated from the engine speed Ne and the basic fuel injection volume $Q_0$. In step s8, it is judged whether the operating condition of the engine is within a control range involving a high fuel return temperature $t_F$ and requiring correction of the basic fuel injection volume $Q_0$, the basic fuel injection pressure $P_0$, and the basic fuel injection timing $T_0$.

Figure 4:
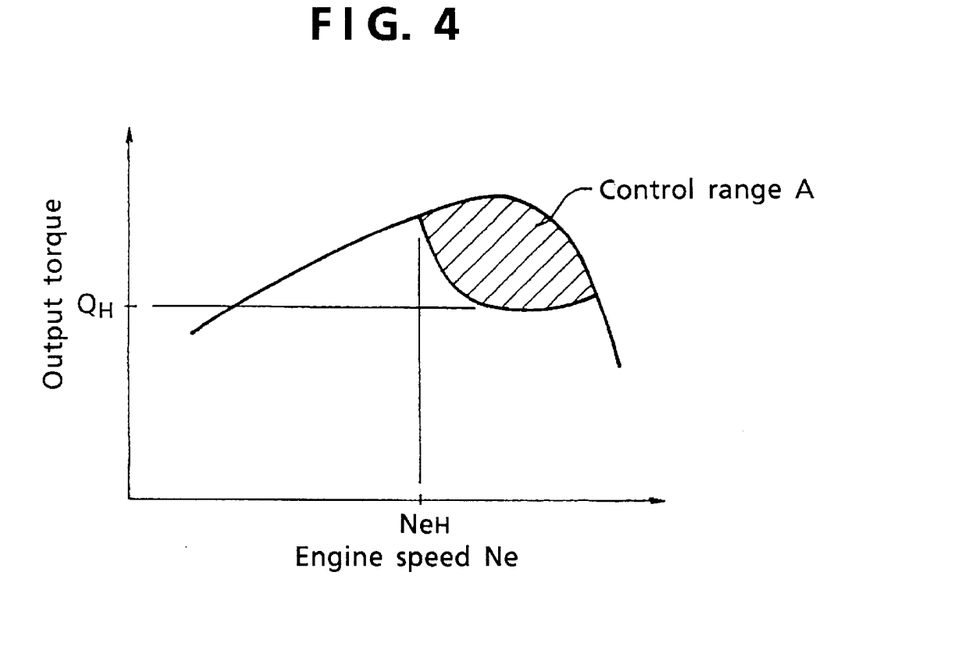
FIG. 4 is an explanatory diagram of a map which represents a control range that the accumulator type fuel injection control device adopts.

Specifically, as shown in the control range map of FIG. 4, the operating condition of the engine, in which the engine speed Ne is in a high revolution region higher than a high revolution $Ne_H$ and the basic fuel injection volume $Q_0$ is in a high output torque region larger than a high fuel injection volume $Q_H$, is set as a control range A. It is judged whether the operating condition of the engine is within this control range A.

If the operating condition of the engine is within the control range A, the procedure moves to step s9, in which the corrected fuel injection volume $Q_A$, the corrected fuel injection pressure $P_A$ and the corrected fuel injection timing $T_A$ are set in accordance with the correction quantity setting routine shown in FIG. 3.

If the operating condition of the engine is not within the control range A in step s8, on the other hand, the above-described processing is not performed. Instead, in step s10, fuel injection control is made at the basic fuel injection volume $Q_0$, the basic fuel injection pressure $P_0$ and the basic fuel injection timing $T_0$. Then, the processing returns to the main routine.

Figure 7:
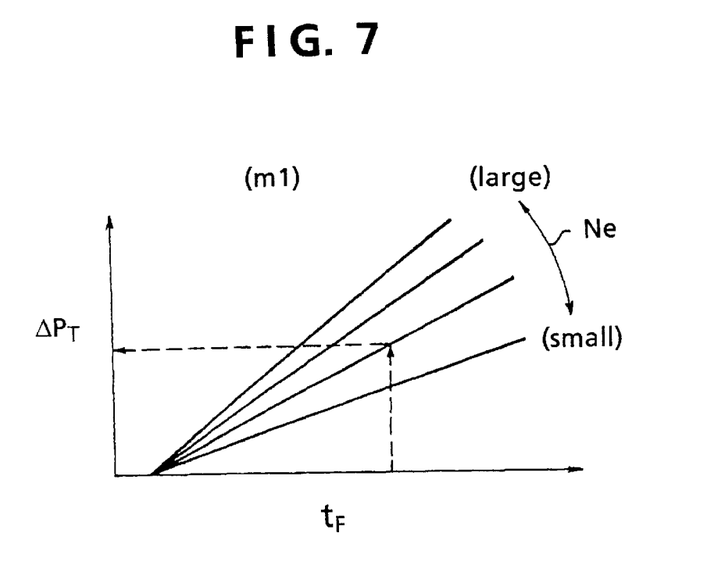
FIG. 7 is an explanatory diagram of a fuel injection pressure decrement correction quantity map that the accumulator type fuel injection control device adopts.

When the processing reaches the correction quantity setting routine because of the engine operating condition falling in the high revolution, high output torque region, the basic fuel injection volume $Q_0$, the basic fuel injection pressure $P_0$, the basic fuel injection timing $T_0$, and the fuel return temperature $t_F$ are inputted in step s21, as shown in FIG. 3. In step s22, a fuel injection pressure decrement correction map m1 of FIG. 7 is inputted. In step s23, a fuel injection pressure decrement correction quantity $\Delta P_T$ is calculated in accordance with the fuel injection pressure decrement correction map m1. In this case, the fuel injection pressure decrement correction quantity $\Delta P_T$, corresponding to the current engine speed Ne and the fuel return temperature $t_F$, is calculated. The fuel injection pressure decrement correction quantity $\Delta P_T$ may be calculated as $\Delta P_T (=\alpha p_{(n)} \times t_F)$ by using an individual pressure conversion constant $\alpha p_{(n)}$ to be set according to the engine speed, rather than using the above map.

Then, in step s24, the fuel injection pressure decrement correction quantity $\Delta P_T$ is subtracted from the basic fuel injection pressure $P_0$ to determine a corrected fuel injection pressure $P_A$ ($=P_0-\Delta P_T$). An example of setting the corrected fuel injection pressure $P_A$ will be described by reference to FIG. 5, a diagram of fuel injection pressure-fuel return temperature characteristics.

Figure 5:
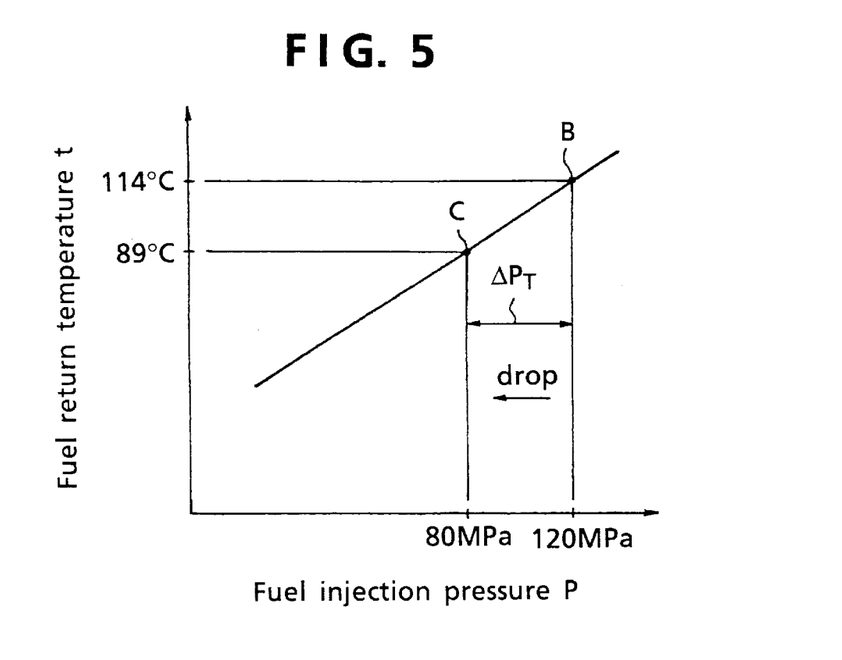
FIG. 5 is a diagram of fuel injection pressure-fuel return temperature characteristics that the accumulator type fuel injection control device adopts.

Assume, for example, that the current operating region is at a point B of FIG. 5, at which the basic fuel injection pressure $P_0$ is 120 MPa and the fuel return temperature $t_F$ is 114° C. If the basic fuel injection pressure $P_0$ is corrected to the corrected fuel injection pressure $P_A$, the operating region comes to a point C in FIG. 5, at which the corrected fuel injection pressure $P_A$ is 80 MPa, and the fuel return temperature $t_F$ is 89° C.

Figure 8:
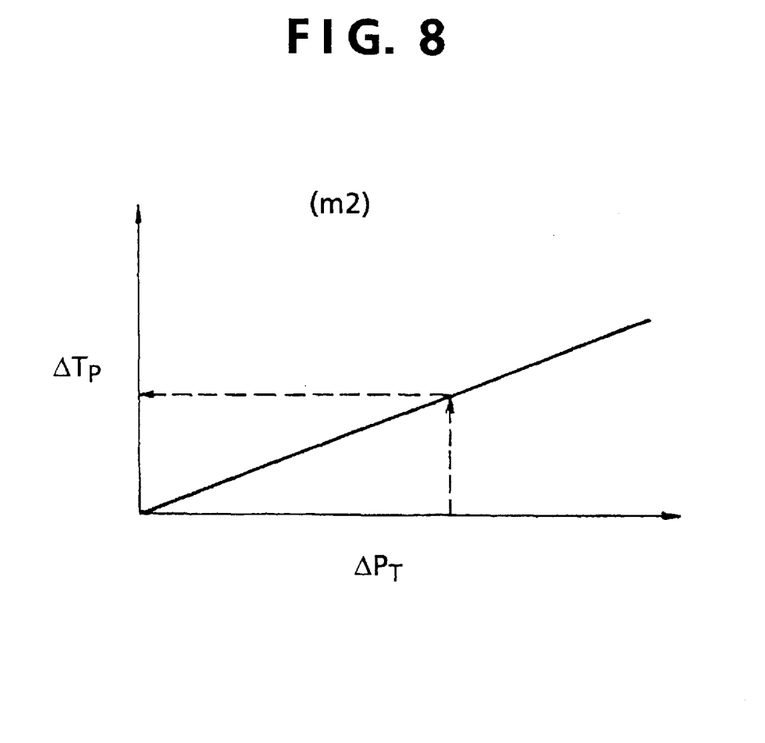
FIG. 8 is an explanatory diagram of a fuel injection timing advance correction map that the accumulator type fuel injection control device adopts.

In step s25, a fuel injection timing advance correction map m2 of FIG. 8 is inputted. In step s26, a fuel injection timing advance correction quantity $\Delta T_p$ corresponding to the fuel injection pressure decrement correction quantity $\Delta P_T$ is calculated in accordance with the fuel injection timing advance correction map m2. The fuel injection timing advance correction quantity $\Delta T_p$ may be calculated as $\Delta T_p$ ($=\alpha_T \times \Delta P_T$) by using an injection timing conversion constant $\alpha_T$, rather than using the above map.

In step s27, the fuel injection timing advance correction quantity $\Delta T_p$ is added to the basic fuel injection timing $T_0$ to determine a corrected fuel injection timing $T_A$.

Figure 9:
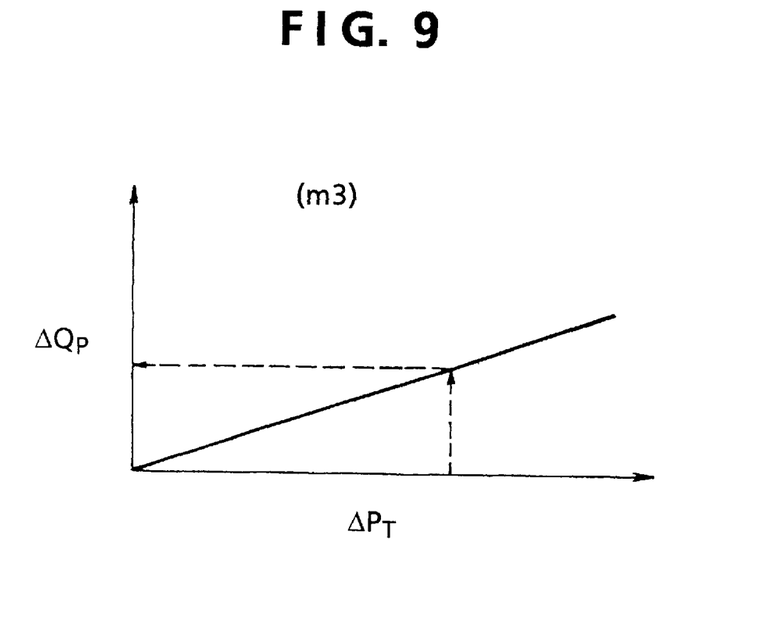
FIG. 9 is an explanatory diagram of a fuel injection volume correction map that the accumulator type fuel injection control device adopts.

Next, in step s28, a fuel injection volume correction map m3 of FIG. 9 is inputted. In step s29, a fuel injection volume correction quantity $\Delta Q_p$ corresponding to the fuel injection pressure decrement correction quantity $\Delta P_T$ is calculated in accordance with the fuel injection volume correction map m3. The fuel injection volume correction quantity $\Delta Q_p$ may be calculated as $\Delta Q_p = \alpha q \times \Delta P_T$) by using an injection volume conversion constant $\alpha q$, rather than using the above map.

In step s30, the fuel injection volume correction quantity $\Delta Q_p$ is added to the basic fuel injection volume $Q_0$ to determine a corrected fuel injection volume $Q_A$. Then, the processing returns to step s10.

An example of setting the corrected fuel injection volume $Q_A$ will be described by reference to FIG. 6, a diagram of fuel injection timing-output torque characteristics.

Figure 6:
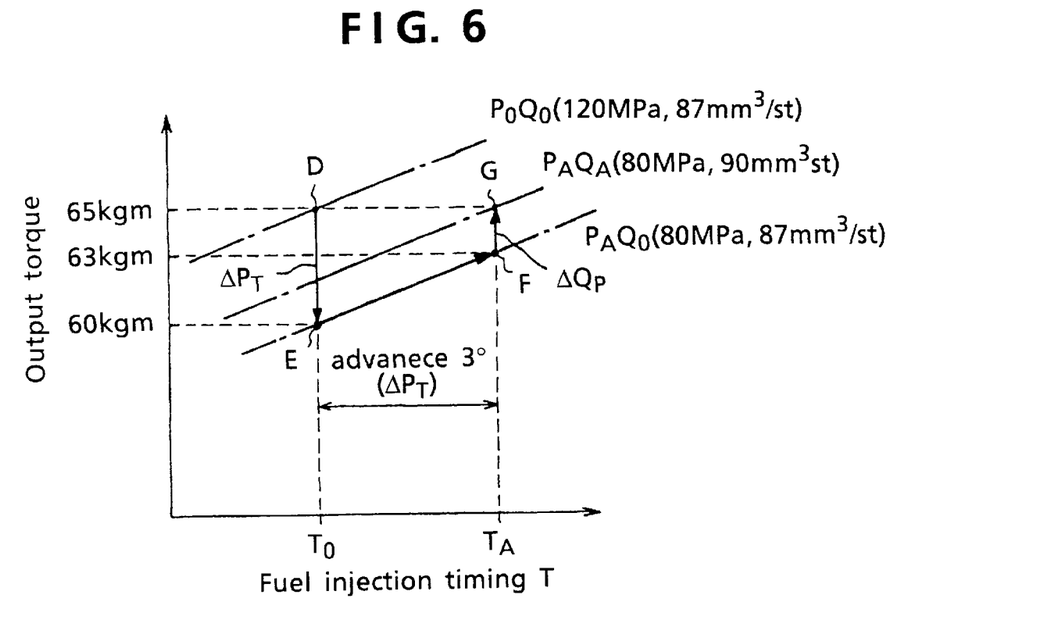
FIG. 6 is a diagram of fuel injection timing-output torque characteristics that the accumulator type fuel injection control device adopts.

Assume, for example, that at point D in FIG. 6, the basic fuel injection volume $Q_0$ is 87 mm³/st, the basic fuel injection pressure $P_0$ is 120 MPa, and the output torque is 65 kgm. When the corrected fuel injection pressure $P_A$ is lowered to 80 MPa as stated earlier, the output torque drops to point E corresponding to 60 kgm. If the basic fuel injection timing $T_0$ is advanced by $\Delta T_p$ (=3°), the output torque recovers to point F corresponding to 63 kgm. When the basic fuel injection volume $Q_0$ is increased by $\Delta Q_p$ to the corrected fuel injection volume $Q_A$(=90 mm³/st), the output torque reaches point G, meaning that the output torque nearly restores the level of point D.

As described above, the accumulator type fuel injection control device of FIG. 1 reduces the basic fuel injection pressure $P_0$ by the fuel injection pressure decrement correction quantity $\Delta P_T$ to lower the fuel return temperature $t_F$ to 89° C. Thus, the rubber hose 52 and fuel tank 25, members used in the fuel return system, can be prevented from heat deterioration or damage to improve safety. Besides, an associated decrease in output can be corrected by an advance processing and an increase in fuel injection volume.

As mentioned previously, there is a case in which the engine operating condition is within the control range A and processing is performed for setting the corrected fuel injection volume $Q_A$, the corrected fuel injection pressure $P_A$ and the corrected fuel injection timing $T_A$. In this case, a warning lamp is turned on, whereby the driver can be informed that such processing is performed because the fuel return temperature $t_F$ is high. Upon lighting of the warning lamp, the driver can adjust the engine output by adjusting the accelerator.

As fully described in the foregoing embodiment, according to the accumulator type fuel injection control device of the present invention, the fuel oil temperature detecting means detects the temperature of the fuel oil in the fuel return passage, the fuel oil pressure correcting means corrects the pressure of the fuel oil on the basis of the temperature of the fuel oil detected by the fuel oil temperature detecting means, and simultaneously the fuel injection volume correcting means corrects the fuel injection volume. Thus, control of the fuel oil temperature, e.g., control for preventing heat deterioration of and damage to the members used in the fuel return system becomes possible. At the same time, control of engine output, e.g., control for output recovery, can be made.

According to the accumulator type fuel injection control device of the present invention, moreover, at the time of control for correction of the fuel oil temperature, the fuel oil pressure correcting means corrects the fuel oil pressure so as to be lowered, when the temperature of the fuel oil begins an excessive rise. At this time, the fuel injection volume correcting means corrects the fuel injection volume so as to be increased, whereby decreased engine output associated with the lowering of the fuel oil pressure is restored to the normal level. Thus, it becomes possible to lower the fuel oil pressure to prevent an excessive rise in the temperature of the fuel oil, and prevent heat deterioration of and damage to the members used in the fuel return system to improve safety. Besides, a decline in engine performance attributed to temperature control for the fuel oil can be prevented.

According to the accumulator type fuel injection control device of the present invention, moreover, in performing control for the temperature correction of the fuel oil, the fuel injection timing correcting means corrects the start timing for fuel injection to an advance side, thereby further recovering engine output decreased by the lowering of the fuel oil pressure. Thus, the fuel oil pressure can be lowered to prevent an excessive rise in the temperature of the fuel oil more reliably, prevent damage to the members used in the fuel return system, and improve safety further.

According to the accumulator type fuel injection control device of the present invention, moreover, when the fuel injection timing correcting means determines a control quantity for correcting the fuel injection start timing to an advance side, it sets the control quantity on the basis of a map or constant set in accordance with a corrected pressure obtained by the fuel oil pressure correcting means. Therefore, the control associated with the calculation of the control quantity for the fuel injection timing is facilitated.

According to the accumulator type fuel injection control device of the present invention, moreover, when the fuel injection volume correcting means determines a control quantity for correcting the fuel injection volume to an increment side, it sets the control quantity on the basis of a map or constant set in accordance with a corrected pressure obtained by the fuel oil pressure correcting means. Therefore, the control associated with the calculation of the control quantity for the fuel injection volume is facilitated.

According to the accumulator type fuel injection control device of the present invention, moreover, when the fuel injection volume correcting means determines a control quantity for correcting the fuel injection volume to an increment side, it sets the control quantity on the basis of the fuel oil temperature detected by the fuel oil temperature detecting means. Therefore, the control associated with the calculation of the control quantity for the fuel injection volume is facilitated.

According to the accumulator type fuel injection control device of the present invention, moreover, the fuel oil temperature detecting means detects the temperature of the fuel oil in the fuel return passage, thus permitting highly accurate control for correction.

In the accumulator type fuel injection control device of the present invention, furthermore, the constituent part made of resin is used in the fuel return system including the fuel return passage, the fuel return passage is formed of resin, or the fuel tank, from which fuel is pumped out by the fuel pressure pump, is made of resin. This can achieve a light weight and a low cost of the device.

INDUSTRIAL APPLICABILITY

As described above, the accumulator type fuel injection control device of the present invention detects the temperature of the fuel oil in the fuel return passage, corrects the pressure of the fuel oil on the basis of the fuel oil temperature, and simultaneously corrects the fuel injection volume. Consequently, it can prevent the heat deterioration of and damage to the members used in the fuel return system to improve safety. At the same time, it makes control for recovery of engine output possible. Thus, this device is preferred for use in a fuel supply system of a diesel engine.

What is claimed is:

1. An accumulator type fuel injection control device, comprising an accumulator for accumulating the pressure of a fuel which is fed under pressure from a fuel pressure pump and for storing the fuel oil;

a feed passage which provides a path between the accumulator and an injection fuel reservoir in a fuel injection valve;

a control passage branched at one end thereof from the feed passage and leading at the other end thereof to a fuel chamber which is formed within the fuel injection valve and which serves to control the opening and closing of a needle valve;

a fuel injection control valve disposed in the control passage, for exerting the pressure of the fuel on the chamber to close the needle valve disposed within the fuel injection valve, and for discharging the fuel present in the fuel chamber to a fuel return passage to open the needle valve, thereby allowing fuel injection to be performed;

fuel oil temperature detecting means for detecting the temperature of the fuel;

fuel oil pressure correcting means for correcting the pressure of the fuel on the basis of the temperature of the fuel detected by the fuel temperature detecting means; and fuel injection volume correcting means for correcting the fuel injection volume simultaneously with the fuel pressure correcting means.

2. The accumulator type fuel injection control device of claim 1, wherein as the fuel temperature detecting means detects a higher temperature of the fuel, the fuel pressure correcting means corrects the pressure of the fuel to a lower side, and also the fuel injection volume correcting means corrects the fuel injection volume to a larger side.

3. The accumulator type fuel injection control device of claim 2, further comprising:

fuel injection timing control means for controlling the fuel injection timing, wherein when the fuel oil pressure correcting means corrects the pressure of the fuel to a lower side, fuel injection timing correcting means for correcting the fuel injection timing corrects the fuel injection start timing to an advance side, and the fuel injection volume correcting means corrects the fuel injection volume to a larger side.

4. The accumulator type fuel injection control device of claim 2, wherein a control quantity for correcting the fuel injection start timing to an advance side by the fuel injection timing correcting means is set on the basis of a map or constant set in accordance with a corrected pressure obtained by the fuel pressure correcting means.

5. The accumulator type fuel injection control device of claim 2, wherein a control quantity for correcting the fuel injection volume to an increment side by the fuel injection volume correcting means is set on the basis of a map or constant set in accordance with a corrected pressure obtained by the fuel pressure correcting means.

6. The accumulator type fuel injection control device of claim 2, wherein a control quantity for correcting the fuel injection volume to an increment side by the fuel injection volume correcting means is set on the basis of the temperature of the fuel detected by the fuel temperature detecting means.

7. The accumulator type fuel injection control device of claim 1, wherein the fuel temperature detecting means detects the temperature of the fuel oil in the fuel return passage.

8. The accumulator type fuel injection control device of claim 1, wherein a constituent part made of resin is used in a fuel return system including the fuel return passage.

9. The accumulator type fuel injection control device of claim 8, wherein the fuel return passage is formed of resin.

10. The accumulator type fuel injection control device of claim 8, wherein the fuel return system includes a fuel tank from which fuel is pumped out by the fuel pressure pump, and the fuel tank is made of resin.

* * * * *